United States Patent
Matsumoto et al.

(10) Patent No.: US 6,539,322 B1
(45) Date of Patent: Mar. 25, 2003

(54) SENSOR DEVICE

(75) Inventors: Masahiro Matsumoto, Hitachi (JP); Kohei Sakurai, Hitachi (JP); Fumio Murabayashi, Urizura-machi (JP); Hiromichi Yamada, Hitachi (JP); Tatsumi Yamauchi, Hitachioota (JP); Atsushi Miyazaki, Mito (JP); Keiji Hanzawa, Mito (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 158 days.

(21) Appl. No.: 09/583,770

(22) Filed: May 31, 2000

(30) Foreign Application Priority Data

May 31, 1999 (JP) .......................... 11-151123

(51) Int. Cl.[7] .............................. G06M 11/02
(52) U.S. Cl. ..................... 702/104; 436/43; 422/100; 422/64; 23/230
(58) Field of Search ............... 702/104; 177/210; 340/347; 436/43; 422/100, 64; 23/230

(56) References Cited

U.S. PATENT DOCUMENTS 4,158,396 A * 6/1979 Suzuki et al. ............ 177/210
4,294,322 A * 10/1981 Nishiyama ............... 177/210
4,568,912 A * 2/1986 Kitamura et al. ......... 340/347
4,631,670 A * 12/1986 Bradley et al. ........... 364/200

FOREIGN PATENT DOCUMENTS

DE  44 12 982 C1  9/1995
JP  10-281912  10/1998

OTHER PUBLICATIONS

*Elektor* Nov. 1998, pp. 72–75 entitled "Programmierbares Sensor–Interface".
*Sensor Review,* vol. 16, No. 1, 1996, pp. 18–21 entitled Universal sensor interface chip (USIC): specification and applications outline by P.D. Wilson et al.

* cited by examiner

*Primary Examiner*—Michael Nghiem
*Assistant Examiner*—Tung Lau
(74) *Attorney, Agent, or Firm*—Crowell & Moring LLP

(57) ABSTRACT

A sensor device is provided which included a digital arithmetic processing unit which performs arithmetic processing through a program stored therein in advance, a pulse generator for generating pulses through the program, and a unit for causing the output voltage of the sensor device to stay at either a power source voltage concerned or the ground voltage, when the pulses from the pulse generator are interrupted, thereby, a sensor device using digital arithmetic processing and outputting analogue voltages is provided allowing the host system to judge easily whether the sensor device is operating normally or is failing.

7 Claims, 4 Drawing Sheets

SENSOR DEVICE

BACKGROUND OF THE INVENTION

1. Field of the Invention

The present invention relates to a sensor device, whose output voltage is corrected through digital arithmetic processing, and, in particular, relates to a sensor device which, when the sensor device fails, informs the host system of the failure.

2. Conventional Art

As a conventional sensor device whose output voltage is corrected through a digital arithmetic processing, JP-A-10-281912 (1998) discloses such a pressure sensor device.

The above conventional art does not take into account a failure of a digital arithmetic processor therein.

Prior to the above conventional device, in a sensor device constituted only by analogue circuits, it was rare for the output voltage of the sensor device to stay at an intermediate voltage due to a failure of the sensor device, but rather the output voltage thereof stays at the respective power source voltage. For this reason, when the output voltage of the sensor stays at the power source voltage or the ground voltage, a host system can judge whether the sensor device has failed. Therefore, when such sensor device has failed, the host system can effect a countermeasure toward a fail safe operation.

Even in the sensor device using the digital arithmetic processing as referred to in the above conventional art, output signals in the form of analogue voltage are frequently used in view of compatibility with analogue type sensor devices. Therefore, through arrangement of a D/A converter at an output-circuit, output signals effected by digital arithmetic processing are outputted after being converted into analogue voltage. However, when the digital arithmetic processing unit has failed, the output signals of the digital arithmetic processing unit stay at an intermediate value, accordingly, the output of the D/A converter which is operated by the output signals of the digital arithmetic processing unit is also caused to stay at an intermediate voltage. When the output signals of the sensor device stay at an intermediate voltage, it is quite difficult to judge whether the sensor device is operating normally or is failing by means of only the output signals of the sensor device. Accordingly, it is difficult to judge whether the concerned sensor device is operating normally or failing by means of the host system, which simply monitors the output signals of the sensor device. Therefore, when the sensor device has failed, the conventional host system could not effect a countermeasure toward a fail safe operation. Namely, with regard to such a problem, the conventional art lacks a proper countermeasure.

SUMMARY OF THE INVENTION

An object of the present invention is to solve the conventional problem referred to above, and, more specifically, to provide a sensor device using a digital arithmetic processing and outputting analogue voltages, which permits a host system to judge easily whether the sensor device is operating normally or failing.

The above object can be achieved by a sensor device according to the present invention, which comprises a digital arithmetic processing means which performs an arithmetic processing through a program stored in advance therein, means for generating pulses through the program, and means for causing the output voltage of the sensor device to stay at either a power source voltage or the ground voltage when the pulses from the pulse generating means are interrupted.

DETAILED DESCRIPTION OF THE EMBODIMENT

Hereinbelow, a sensor device representing an embodiment according to the present invention will be explained with reference to the drawings.

Figure 1:
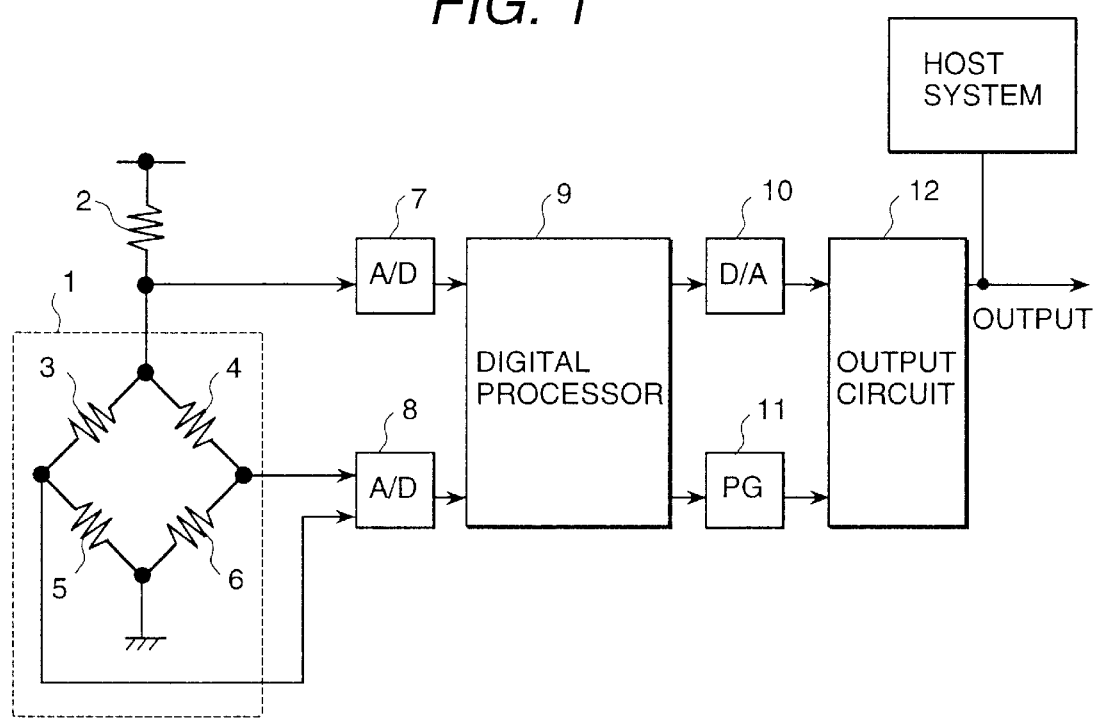
FIG. 1 is a block diagram of a sensor device representing an embodiment according to the present invention.
Figure 2:
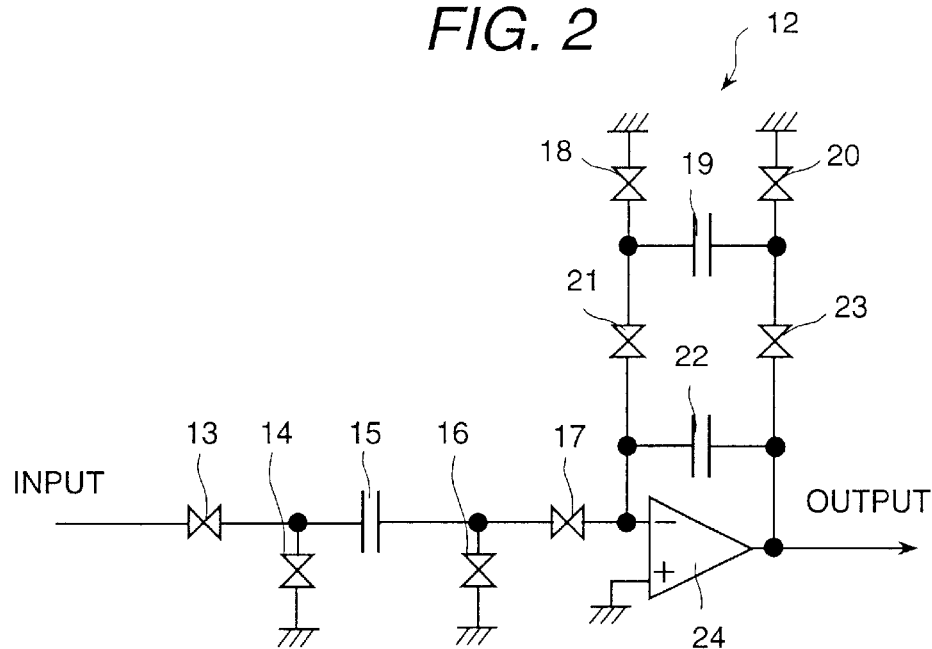
FIG. 2 is a circuit diagram of an output circuit 12 in FIG. 1 embodiment.
Figure 3:
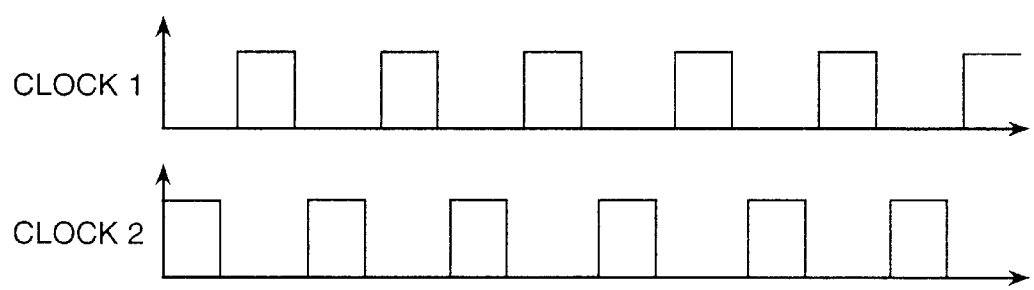
FIG. 3 shows output signals from a pulse generator 11 in FIG. 1 embodiment.
Figure 4:
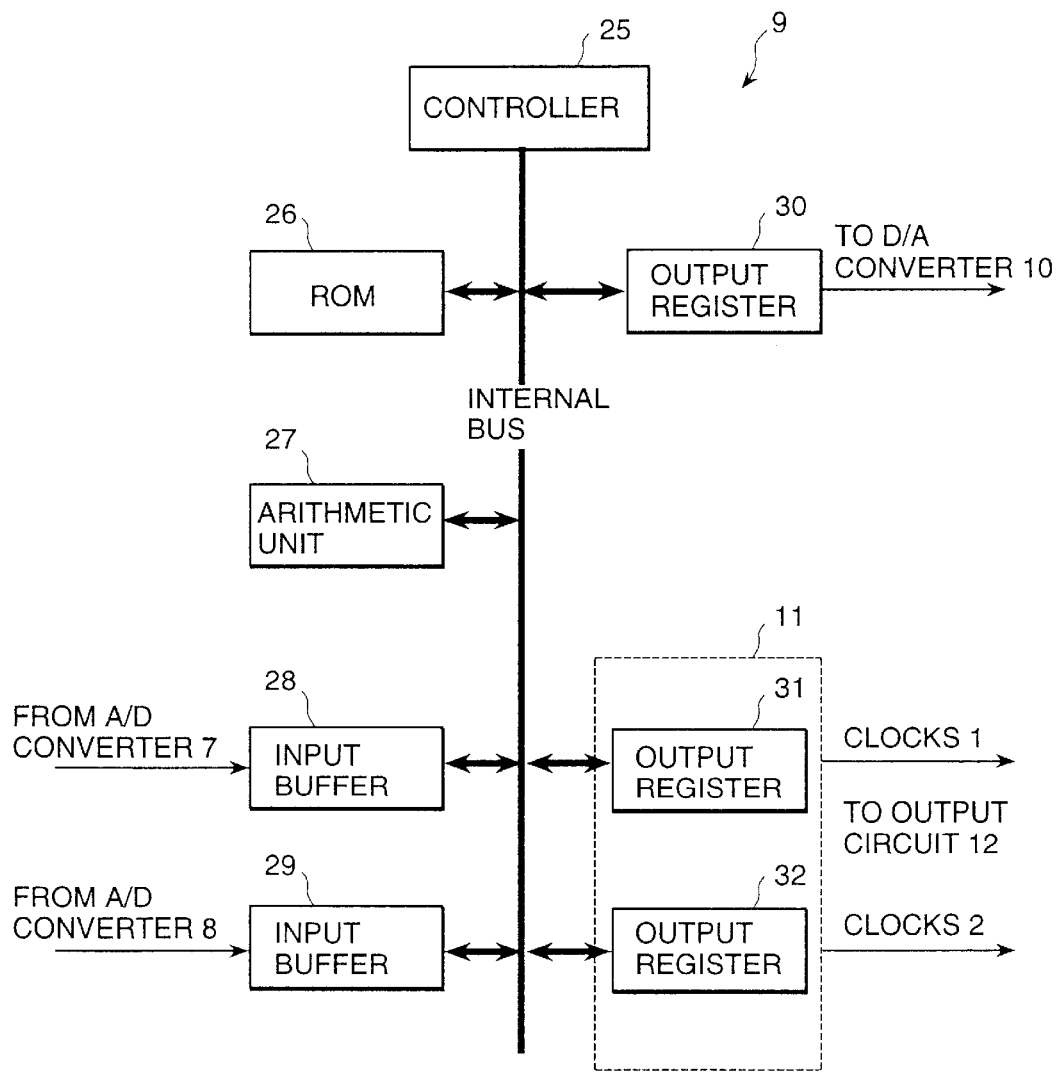
FIG. 4 is a block diagram of a digital arithmetic processing unit 9 in FIG. 1 embodiment.
Figure 5:
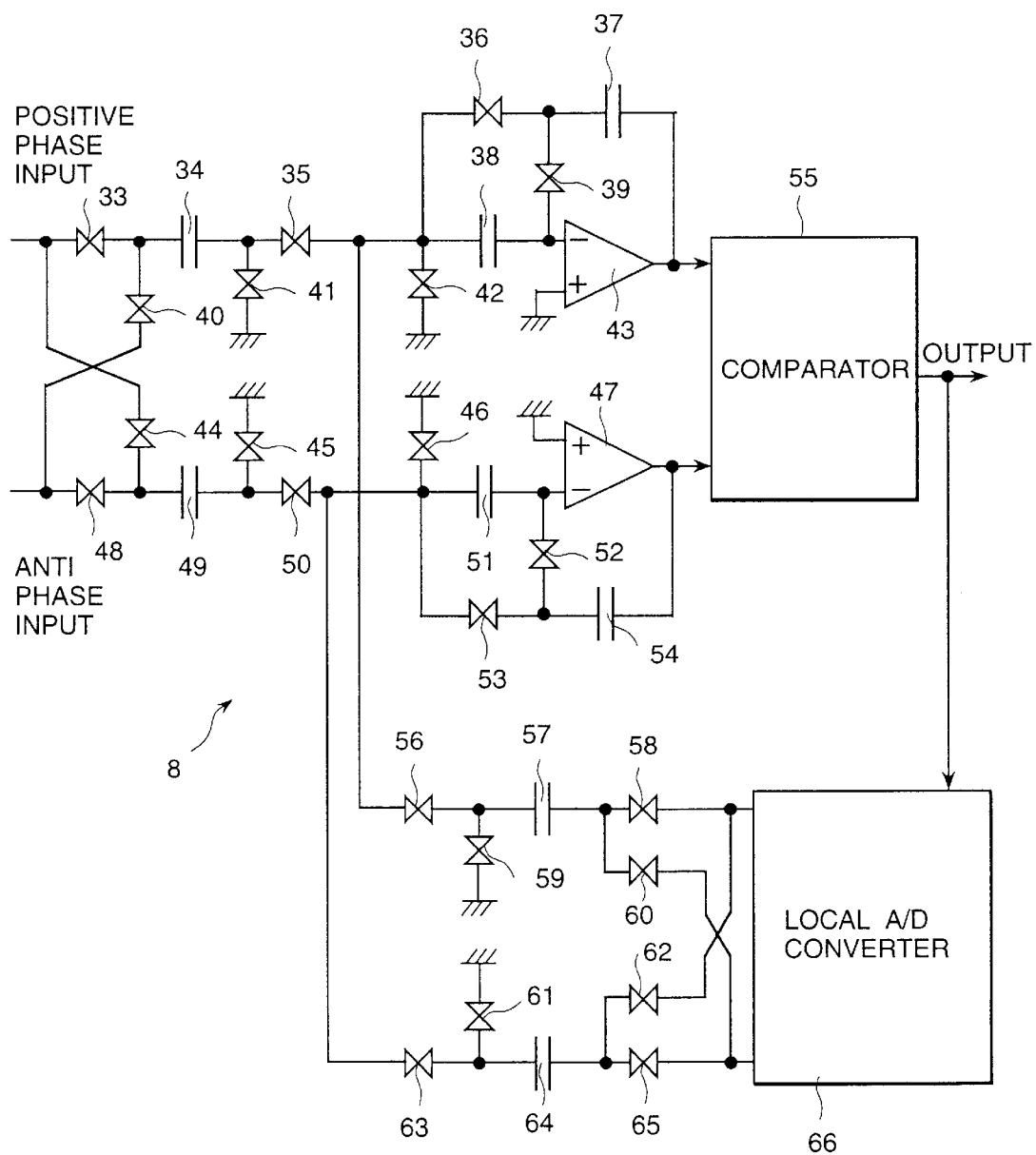
FIG. 5 is a circuit diagram of an A/D converter 8 in FIG. 1 embodiment.

FIG. 1 shows a schematic structure of the sensor device of the embodiment, FIG. 2 shows a structure of an output circuit 12 in FIG. 1, FIG. 3 shows output signals from a pulse generator 11 in FIG. 1, FIG. 4 shows a structure of a digital arithmetic processing unit 9 in FIG. 1 and FIG. 5 shows a structure of an A/D converter 8 in FIG. 1.

The sensor device of the present embodiment is constituted by a physical quantity detection element 1 which is constituted by a bridge circuit with resistors 3, 4, 5 and 6; another resistor 2 having a different temperature coefficient from the resistors 3, 4, 5 and 6 and being connected in series with the bridge circuit, an A/D converter 8 which converts bridge output voltages from the physical quantity detection element 1 into digital signals; another A/D converter which converts intermediate voltages at the junction of the physical quantity detection element 1 and the resistor 2 into digital signals; a digital arithmetic processing unit 9 which performs a digital arithmetic processing on the output voltages from the A/D converters 7 and 8 and thereby corrects the output voltage characteristic for the measured physical quantity of the sensor unit formed by the physical quantity detection element 1 and the resistor 2 so as to satisfy a predetermined standard; a D/A converter 10 which converts the arithmetic result from the digital arithmetic processing unit 9 into analogue voltages; a pulse generator 11 which is controlled by the digital arithmetic processing unit 9 and generates clock pulses; and an output circuit 12 which is operated by the clock pulses from the pulse generator 11 and generates output signals depending on the output voltages from the D/A converter 10.

At first, the operation of the sensor device according to the present embodiment will be outlined. In the present embodiment, the bridge circuit output voltages of the physical quantity detection element 1, which vary depending on the measured physical quantities, are converted by the A/D converter 8 into digital signals, the intermediate voltages at the junction of the physical quantity detection element 1 and the resistor 2, which vary depending on the temperature of the physical quantity detection element 1 because of the temperature coefficient difference of the resistors 3, 4, 5 and 6 from the resistor 2, are converted into digital signals by the A/D converter 7, the output signals of the A/D converters 7 and 8 are operated upon by an arithmetic processing via the digital arithmetic processing unit 9, and thereby the output voltage characteristic of the sensor unit is corrected with respect to the measured physical quantities so as to satisfy a predetermined standard, thereafter the arithmetic result is converted into analogue signals by the D/A converter 10 and the output signals depending on the converted analogue signals are generated from the output circuit 12.

Now, the structure of the output circuit 12 will be explained with reference to FIG. 2. The output circuit 12 is constituted by a capacitor 15, analog switches 13, 14, 16 and 17 which charge and discharge the capacitor 15 with the input voltages, a capacitor 19, analog switches 18, 20, 21 and 23 which charge and discharge the capacitor 19 with the output voltages, an operational amplifier 24 and a capacitor 22 connected in a feed back circuit for the operational amplifier 24. The output circuit 12 is activated by clock 1 and clock 2 represented by non-overlapping clock signals illustrated in FIG. 3 and prepared by the pulse generator 11, and thus generates the output signals proportional to the input signal formed by repeating two states (which will be explained hereinbelow). First state corresponds to a high level state of the clock 1, and in this state the analog switches 13, 17, 21 and 23 are switched to an OFF state and the analog switches 14, 16, 18 and 20 are switched to an ON state, thereby, the capacitors 15 and 19 are discharged. The second state corresponds to a high level state of the clock 2, and in this state the analog switches 13, 17, 21 and 23 are switched to the ON state and the analog switches 14, 16, 18 and 20 are switched to the OFF state, thereby, the input voltages are applied to the capacitor 15 and the output voltages are applied to the capacitor 19. Accordingly, the charging current at this instance flows through the analog switch 13, the capacitor 15 and the analog switch 17 to the capacitor 22 and the operational amplifier 24, and the capacitor 22 is additionally charged by electric charges, which correspond to those charged into the capacitor 15. Further, the capacitor 19 is charged by voltages corresponding to the output voltages and the charging current flows through the analog switch 23, the capacitor 19 and the analog switch 21 to the capacitor 22, thereby, the capacitor 22 is additionally charged by the electric charges which correspond to those charged into the capacitor 19. Accordingly, electric charges charged into the capacitor 22 are expressed by the following equation;

$$Q22[n]=Q22[n-1]+C15*Vin+C19*V0[n]$$

wherein,

Q22[n]: Electric charge quantity charged in the capacitor 22 at the present time Q22[n−1]: Electric charge quantity charged in the capacitor at one clock prior time C15: Capacitance value of the capacitor 15

C19: Capacitance value of the capacitor 19

Vin: Input voltage

V0[n]: Output voltage at the present time

Further, the output voltage V0[n] at the present time can be expressed as follows;

$$V0[n]=-Q22[n]/C22$$

wherein,

C22: Capacitance value of the capacitor 22

When combining the above two equations the following equation is given;

$$V0[n]=\{C22*V0[n-1]C15*Vin\}/(C22+C19)$$

When determining a final value according to the above equation based on final value theorem, the following equation representing an output voltage roportional to the input voltage Vin stands;

$$V0=-C15/C19*Vin$$

Further, in a circuit such as the output circuit 12, which is operated while performing charging and discharging the capacitors, if the clock signals are interrupted, the output voltages thereof stay at either a power source voltage concerned or the around potential. Namely, when it is desired to maintain the output voltage of the present sensor device either at the power source voltage concerned or the ground potential, such can be realized by interrupting the clock signals applied to the output circuit 12.

Now, the structure of the digital arithmetic processing unit 9 will be explained with reference to FIG. 4. The digital arithmetic processing unit 9 is constituted by a ROM 26 which stores a program for operating the digital arithmetic processing unit 9, an arithmetic unit 27 which executes arithmetic, an input buffer 28 which receives the output data from the A/D converter 7, another input buffer 29 which receives the output data from the A/D converter 8, an output register 30 which outputs data to the D/A converter 10 and a control circuit 25 which interprets the program stored in the ROM 26 and manages the operation of the ROM 26, the arithmetic unit 27, the input buffer 28, the input buffer 29 and the output register 30. Input and output to and from the ROM 26, the arithmetic unit 27, the input buffers 28 and 29 and the output register 30 are performed via an internal bus, and the control circuit 25 operates the respective blocked elements while interupting the program stored in the ROM 26 and executes the arithmetic processing.

The pulse generator 11 is constituted by output registers 31 and 32 which are directly connected to the internal bus in the digital arithmetic processing unit 9. Writing into the respective registers 31 and 32 is performed via the internal bus. Further, the output register 31 is a register for holding the signals of clocks 1 and the output register 32 is a register for holding the signals of clocks 2.

Now, production method of signals of clock 1 and clock 2 will be explained. The production of the signals of clock 1 and clock 2 is performed by writing alternatively "1" and "0" into the output registers 31 and 32 according to the program stored in the ROM 26. Namely, clock 1 are produced through storing a program in the ROM 26 in advance which functions in such a manner that at a timing when the clock 1 is to be changed into a high level, "1" is written into the register 31, and at a timing when the clock 1 is to be changed into a low level, "0" is written into a register 31. Likely, with regard to clocks 2, the clocks 2 are produced through storing a program in the ROM 26 in advance which functions in such a manner that at a timing when the clock 2 is to be changed into a high level, "1" is written into the register 32, and at a timing when the clock 2 is to be changed into a low level, "0" is written into a register 32. With such measures, when the digital arithmetic processing unit 9 fails due to any cause which prevents a proper operation of the program, the writing operation to the output registers 31 and 32 is interrupted, and the application of the pulses to the output circuit 12 is likely interrupted, thus the output voltage of the present sensor device is caused to stay at either the power source voltage concerned or the ground potential. Accordingly, when the digital arithmetic processing unit 9 fails, the output voltage of the sensor device stays at either the power source voltage concerned or the ground potential. Namely, when the sensor device fails, the output voltage thereof can be set at the power source voltage concerned or the ground potential, therefore, when such condition is detected by a host system which monitors the output of the sensor device, it is judged that the present sensor device has failed and the host system can activate a proper countermeasure toward a fail safe operation.

Now, a failure detection method in the physical quantity detection element 1 will be explained. The physical quantity detection element 1 is constituted by a bridge circuit formed by the resistors 3, 4, 5 and 6, and is connected to a power source via the resistor 2. As a cause of failure of the physical quantity detection element 1, a disconnection or a short circuiting of the resistors 3, 4, 5 and 6 serving as the constituting elements for the physical quantity detection element 1 is possible. When one of the resistors 3, 4, 5 and 6 is disconnected or short-circuited, the intermediate voltage at the junction of the physical quantity detection element 1 and the resistor 2, namely, the voltage at the measurement point of the A/D converter 7 or the output voltage of the physical quantity detection element 1, namely the voltage at the measurement point of the A/D converter 8 widely varies. Accordingly, by setting in advance a predetermined band in the measurement voltage for the A/D converters 7 and 8 and when the measurement voltage goes out from the predetermined band for a predetermined time, a failure of the physical quantity detection element 1 is assumed, in response thereto, the clock 1 and clocks 2 representing the output signals of the pulse generator 11 are interrupted, and thereby the output of the output circuit 12 is interrupted to keep the output voltage of the sensor device at either the power source voltage concerned or he ground potential, thus the host system is emitted to detect the failure of the present sensor device. Further, with the failure detection method of the physical quantity detection element 1 as has been explained above, the failure of the physical quantity detection element 1 can be detected by making use of the voltages of the measurement points for the A/D converters 7 and 8 without adding a further measurement point.

Now, the structure of the A/D converter 8 will be explained with reference to FIG. 5. The A/D converter is a differential type ΔΣ modulation circuit which is constituted by a first integrator constituted by an operational amplifier 43, capacitors 34, 38 and 37 and analogue switches 33, 35, 36, 39, 40, 41 and 42; a second integrator performing a differential operation with respect to the first integrator and being constituted by an operational amplifier 47, capacitors 49, 51 and 54 and analogue switches 44, 45, 46, 48, 50, 52 and 53; a comparator 55 which compares the output voltages of the first and second integrators; a local D/A converter 66 which varies the output voltages depending on the output of the comparator 55; a SC circuit feeding back the output of the local D/A converter 66 to the first integrator and being formed from a capacitor 57 and analogue switches 56, 59, 58 and 60; and another SC circuit feeding back the output of the local D/A converter 66 to the second integrator and being formed from a capacitor 64 and analogue switches 61, 62, 63 and 65. Since the A/D converter 8 outputs signals having a pulse density depending on the input voltage thereto, therefore, a digital value depending on the input voltage is obtained by determining the pulse density with the A/D converter 8. The A/D converter 8 is further constituted so as to compensate offset voltages of the operational amplifiers 43 and 47 by charging the same into the capacitors 38 and 51. Further, with the provision of the first and second integrators and by operating the same in differential manner, a highly accurate A/D conversion is realized.

According to the present invention, the posslbility of having the output voltage of the sensor device stay at an intermediate voltage due to a failure thereof is suppressed, and to the contrary, the output voltages are caused to stay at either the power source voltage concerned or the ground potential, thus the failure of the sensor device can be easily detected by a host system and the host system can easily effect a countermeasure toward a fail safe operation, even when the sensor device fails.

What is claimed is:

1. A sensor device comprising, a physical quantity detection element of which output signals vary depending on a measured physical quantity; and an arithmetic unit which performs an arithmetic processing on the output signals according to a program stored therein in advance, wherein the sensor device further comprises a means for generating pulses according to the programs and a further means for causing the output voltage of the sensor device to stay at either a power source voltage concerned or a ground potential, when the pulses from the pulse generating means are interrupted.

2. A sensor device comprising, a physical quantity detection element of which output signals vary depending on a measured physical quantity; and an arithmetic unit which performs an arithmetic processing on the output signals according to a program stored therein in advance, wherein the sensor device further comprises a pulse generating means for generating pulses according to the programs; analogue switches of which ON and OFF states are controlled by the pulses from the pulse generating means; and capacitors which are charged and discharged through the operation of the analogue switches.

3. A sensor device comprising, a physical quantity detection element of which output signals vary depending on a measured physical quantity; and an arithmetic unit which performs an arithmetic processing on the output signals according to a program stored therein in advance, wherein the sensor device further comprises a means for detecting a failure of the physical quantity detection element and a further means for causing the output voltage of the sensor device to stay at either a power source voltage concerned or a ground potential.

4. A sensor device comprising a physical quantity detection element (1) which is constituted by a bridge circuit with resistors (3, 4, 5 and 6); another resistor (2) having a different temperature coefficient from the resistors (3, 4, 5 and 6) and being connected in series with the bridge circuit, a first A/D converter (8) which converts bridge circuit output voltages from the physical quantity detection element (1) into digital signals; a second A/D converter (7) which converts intermediate voltages at the junction of the physical quantity detection element (1) and the other resistor (2) into digital signals; a digital arithmetic processing unit (9) which performs a digital arithmetic processing on the output voltages from both of the A/D converters (7 and 8) and thereby corrects the output voltage characteristics for the measured physical quantity of the sensor unit formed by the physical quantity element (1) and the other resistor (2) so as to satisfy a predetermined standard band; a D/A converter (10) which converts the arithmetic result from the digital arithmetic processing unit (9) into analogue voltages; a pulse generator (11) which is controlled by the digital arithmetic processing unit (9) and generates clock pulses; and an output circuit (12) which is operated by the clock pulses from the pulse generator (11) and generates output signals depending on the output voltages from the D/A converter (10), wherein when at least one of the sensor unit (1 and 2) and the digital arithmetic processing unit (9) fails or malfunctions, pulse generation by the pulse generator (11) is interrupted and the output signal level of the output circuit (12) is caused to stay at either a power source voltage concerned or the ground potential.

5. A sensor device according to claim 4, wherein the pulse generator (11) comprises a first output register (31) for generating a first series of clock pulses and a second output register (32) for generating a second series of clock pulses.

6. A sensor device according to claim 4, wherein the first A/D converter (8) is a differential type ΔΣ modulation circuit.

7. A sensor device according to claim 4, wherein output signal levels of the output circuit (12) are monitored by a host system.

* * * * *